Dec. 7, 1926.

N. W. PERKINS

OVERDRAFT KEY LOCKING MECHANISM FOR CALCULATING MACHINES

Filed March 23, 1926  2 Sheets-Sheet 1

1,609,768

Inventor;
Nathan W. Perkins
By

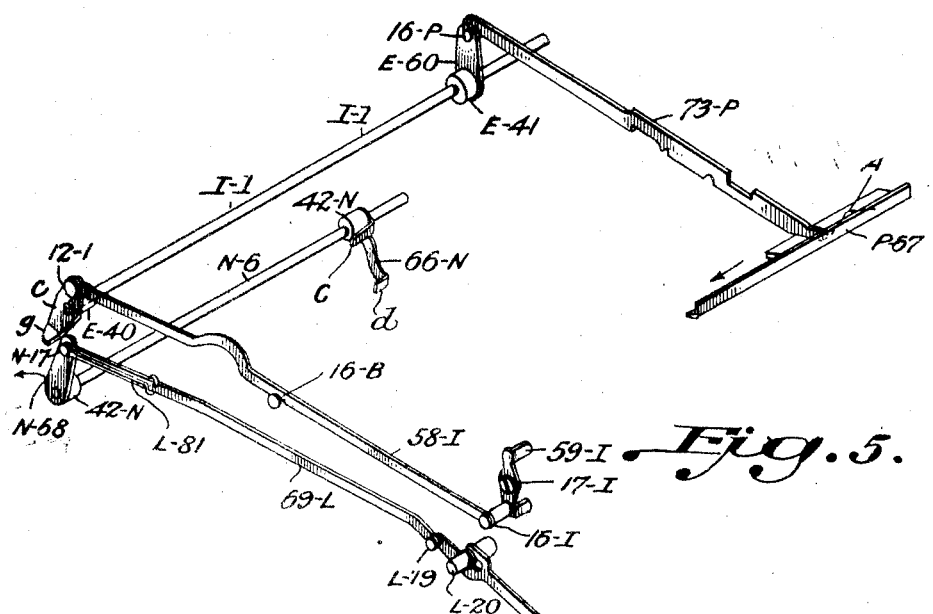
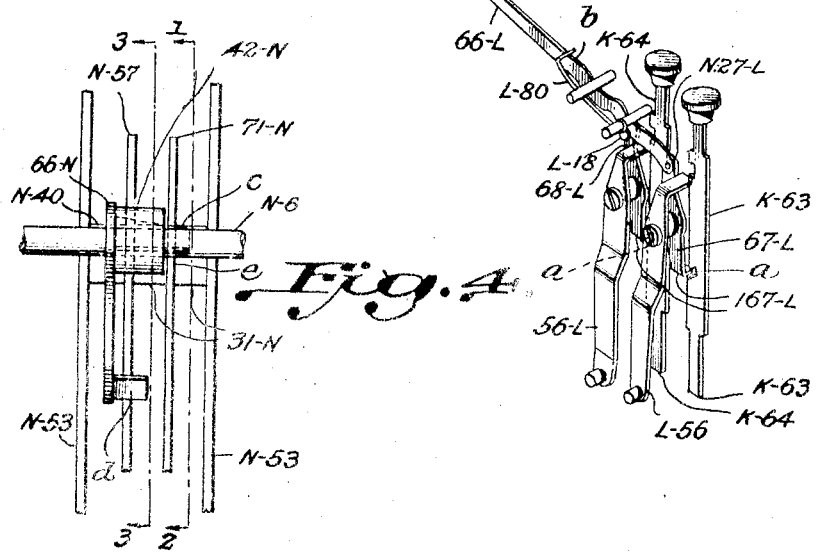

Patented Dec. 7, 1926.

1,609,768

UNITED STATES PATENT OFFICE.

NATHAN W. PERKINS, OF NEWARK, NEW JERSEY, ASSIGNOR TO ELLIS ADDING-TYPEWRITER COMPANY, OF NEWARK, NEW JERSEY, A CORPORATION OF NEW JERSEY.

OVERDRAFT KEY-LOCKING MECHANISM FOR CALCULATING MACHINES.

Application filed March 23, 1926. Serial No. 96,735.

This invention relates to overdraft key locking mechanism for calculating machines.

There are certain classes of work which an adding and subtracting machine is required to handle, that necessitate notice to the operator when the debit items accumulated exceed the credit items, that is to say, when the result after a subtracting operation is less than zero, to wit, a negative amount.

Depositors' accounts in banks constitute a class of work wherein such a notification is important because an account wherein the total of the checks exceeds the total of the deposits, is "overdrawn".

When a negative result or amount is in the accumulator, if this is printed it will appear as the complement of the negative amount, or overdraft, and not as the true negative result.

It is desirable, therefore, to notify the operator of the machine that a negative amount or overdraft is contained in the accumulator, to enable the operator to so operate the machine that it will print the negative amount or overdraft and not the complement thereof.

The patent to F. W. Bernau, No. 1,508,267, September 9, 1924, and application Serial No. 598,155, filed October 31, 1922, of which said patent is a division, sets forth mechanism which will automatically notify the operator when an overdraft or negative amount is contained in the accumulator. The Bernau mechanism contemplates the automatic locking of the total and sub-total keys of the machine when an overdraft condition exists, and when the operator attempts to depress either the total or sub-total key, his inability to do so notifies him that an overdraft exists in the accumulator. The operator then proceeds to release the automatic overdraft key locking means so that the complement of the overdraft amount may be printed.

My invention has for its object the provision of improved means for automatically locking the total and sub-total keys of the machine when the result set up on the accumulator, after subtraction, is less than zero, that is, represents a negative amount.

My improvements not only contemplate the use of means by which the operator may manually unlock a total or sub-total key which has been automatically locked by the overdraft mechanism, but, also, I provide mechanism by which the operator may continue to perform additions in the accumulator, after said key or keys have been locked, until the negative amount in the accumulator has been converted into a positive amount.

My improvements, therefore, accomplish the result obtained by the Bernau mechanism and the further result of enabling the operator to bring about a positive result in the accumulator, by further addition, for the purpose of unlocking the total and sub-total keys which have previously been locked by the overdraft condition of the machine.

The present mechanism, like the Bernau mechanism referred to, is particularly adapted for use in connection with the adding and subtracting accumulator of the "Ellis" machine, such accumulator being set forth in patent to Halcolm Ellis, mechanical calculator, No. 1,203,863, November 7, 1916.

It will be understood, however, that the present improvements and the principles involved therein are not, necessarily, restricted to embodiment in mechanism similar to that of the "Ellis" machine as these improvements may be used in other calculating machines and the claims are to be understood as covering any improvements involving the principles of the invention in whatever calculating machine they may be employed.

The present improvements being additional to the mechanism of the Ellis machine and to the adding and subtracting accumulator set forth in the Ellis Patent, No. 1,203,863, reference is to be had to said Ellis patent for a full disclosure of such mechanisms, related to the present improvements, and cooperating directly or indirectly therewith, as are not fully illustrated and described herein.

The preferred embodiment of the invention is hereinafter described and shown in the accompanying drawings but it is obvious that the principle involved may be carried out by the use of modified mechanism.

Figure 1:
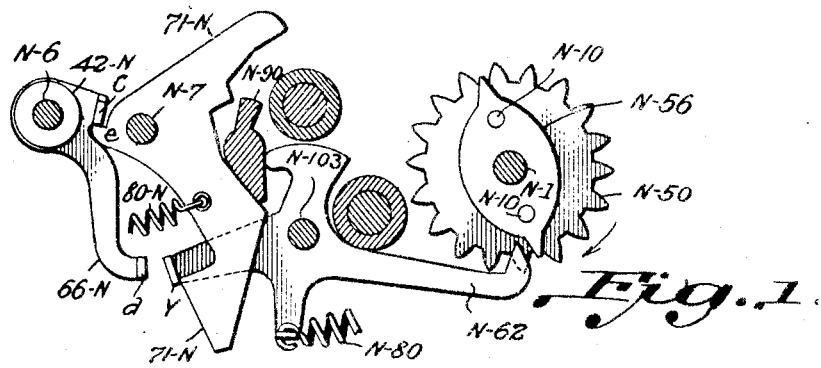
Figure 1 is a detail section on the line 1—2, Figure 4, through the shift bar, accumulator shaft, and other shafts of the accumulator of the Ellis Patent 1,203,863, showing my improvements applied thereto, the adding hook and certain other parts of the Ellis accumulator being omitted for the sake of clearness, the subtracting parts being in normal position.

Figure 4 is a rear elevation looking toward the left of Figure 1, certain parts being omitted for the sake of clearness; and Figure 5 is a perspective view showing the total and sub-total keys, the locking means therefor, and operative connections controlled by the accumulator, has also the manually operated means for releasing the key locks; the frame of the machine and the accumulator being entirely omitted for the sake of clearness.

The adding and subtracting accumulator illustrated embodying the principle involved in the Ellis accumulator set forth in Patent 1,203,863, and the general nature and object of an automatic overdraft total and sub-total key locking mechanism having been set forth fully in the Bernau Patent No. 1,508,267, reference will be made only to such mechanisms as should be described to show the construction, operation, and results obtained by my mechanism. No numeral keys are shown nor any controlling keys other than the total key K63 and the sub-total key K64, these latter keys being the only ones with which the present invention is concerned.

The keys K63, K64, may be, as set forth in the Ellis and Bernau patents, latched, when depressed by latches L56 and 56L, but these latches constitute no part of the present invention.

The keys K63 and K64 have a notch $a$. Pivoted latches 67L and 68L are provided with offsets or lugs 167L which are adapted to enter the notches $a$ for the purpose of locking the keys K63, K64 to prevent said keys from being depressed.

The latches 67L, 68L, normally are free of the notches $a$ but when the mechanism of the present invention operates on the occurrence of an overdraft in the accumulator, that is, when the result becomes less than zero after a subtracting operation performed on the accumulator, the latches 67L, 68L are moved to cause their lugs 167L to enter the notches $a$ and prevent the keys K63, K64 from being depressed. Consequently, if a negative amount or result is set up in the accumulator having the wheels N50, the keys K63, K64, will be automatically locked. When the operator seeks to depress one of said keys and finds that the key cannot be set he is thus notified that an overdraft condition exists in the accumulator.

The latches 67L, 68L, are pivoted to a shiftable bar 66L which is guided by a stud L20. A spring L80 which is suitably anchored and maintained under tension by studs, rests on the bar 66L and cooperates with a projection or hump $b$ for the purpose of keeping said bar in either one of its positions.

A link 69L which is pivoted to bar 66L at L19, is pivoted at N17 to an arm N68. The arm N68 is secured on a rock shaft N6, mounted in suitable bearings.

Certain parts of the frame of the machine appear at N53, Fig. 4.

Fast on the rock shaft N6 is an arm 66N which has laterally extending or bent fingers or projections $c$, $d$. The cooperation of the fingers $c$, $d$, with mechanism now to be described, results in a rocking of the shaft N6 and the operation of the latches 67L, 68L, which, in turn, unlocks or locks the keys, K63, K64.

Figure 3:
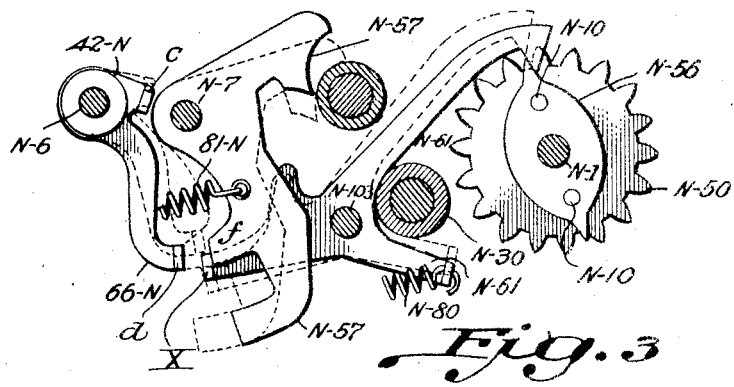
Figure 3 is a similar view on the line 3—3, Figure 4, the subtracting hook, shift bar, and certain other parts being omitted for the sake of clearness, the adding parts appearing in full lines in their normal position and in dotted lines when passing zero in an adding operation.
Figure 2:
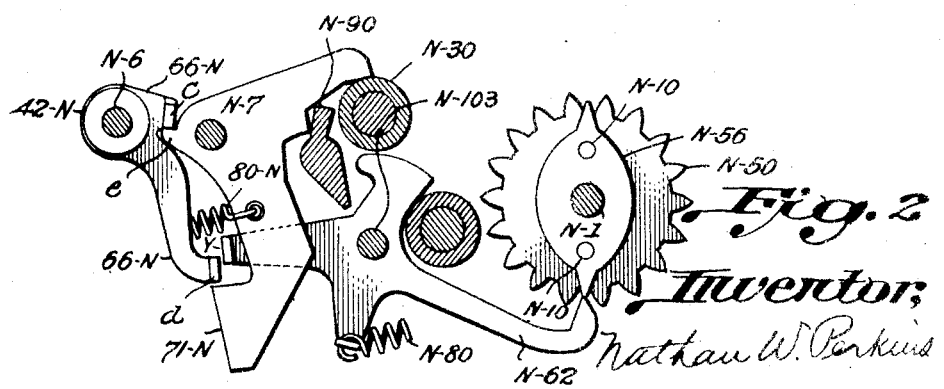
Figure 2, is a similar view, the parts being in the positions assumed when passing zero in a subtracting operation.

Referring to Figures 1, 2 and 3, I have illustrated only the left hand or highest order of accumulator wheel N50 as it is the wheel of the highest order of the series of wheels of the accumulator which is utilized, as in the mechanism of the Bernau Patent 1,508,267, to operate the overdraft key locking mechanism. It will be understood that the accumulator of the machine will contain as many of the accumulator wheels N50 as required by a number of banks or rows of numeral keys.

No disclosure is made of the cam plates and carrying detent (shown respectively at N55, N56, and N54, in the Ellis Patent 1,203,863) which comprise a part of the accumulator with which my improvements are combined and reference is to be had, in that connection, to the Ellis patent, as a showing of these parts would render less clear the particular improvements represented by the present invention.

The wheel N50 has a cam N56 provided with diametrically opposed points, the cam being secured to the face of the wheel by rivets N10.

The adding hook appears at N61 and the subtracting hook is shown at N62. The points of these hooks are adapted to cooperate with the points of the cam N56.

The shift bar N90 is adapted to be turned through a limited number of degrees to set the adding and subtracting hooks of the accumulator so that the accumulator may be used either for addition or subtraction, as explained in the aforesaid Ellis patent. Springs N80 cooperate with the hooks N61, N62, respectively, so as to tend to turn them to bring their points in position for engagement by the points on the cam N56. Setting of the shift bar N90 determines which set of hooks will be free to operate and which will be blocked.

The rod which carries the accumulator wheels appears at N1. The rod on which the adding and subtracting hooks are mounted is shown at N103.

My present improvements are additional to the accumulator mechanism and their principle is not to modify the accumulator mechanism but to utilize it for the purpose of locking the total and sub-total keys K63, K64, when the wheel N50 of the highest order of the accumulator while turning in the direction indicated by the arrow, Figure 1, causes a point of the cam N56 to engage and depress the subtracting hook N62 during a subtracting operation which brings about a result less than zero.

My invention also contemplates the provision of improvements by which, on adding into the accumulator an amount which will restore or convert a negative result previously set up on the accumulator, to a positive result or amount, the locking mechanism for the total and sub-total keys K63, K64 will be restored to normal position, thereby unlocking said keys.

With these ends in view, I provide an actuating arm 71N, Figures 1 and 2, and a return arm N57, Figure 3 mounted side by side on a rod N7. The actuating arm 71N is drawn in clockwise direction, when free, by a spring 80N which is connected to it and is suitably anchored so that it will constantly exert tension on said actuating arm. The return arm N57 is, in like manner, actuated by its own spring 81N whose tendency is to turn the said arm N57 in a clockwise direction.

The actuating arm 71N is normally latched by a lug or projection Y on the subtracting hook N62 as shown in Figure 1 but when the subtracting hook is moved from its normal position by the engagement therewith of one of the points on the cam N56, the lug or projection Y is released from the actuating arm 71N and, thereupon, the spring 80N snaps the actuating arm 71N to the position shown in Figure 2, the movement of the actuating arm being arrested in any suitable manner, as for instance, by the rod or sleeve N30 which is carried by the frame of the machine.

The release of the actuating arm 71N, in the manner set forth results in a projection or part e of the said arm engaging the lug or projection c of the arm 66N. The shaft N6 is thereby immediately turned, the arm N68 is rocked in the direction of the arrow, Figure 5, and the bar 66L and link 69L at once swings the latches 67L, 68L so that their projections 167L enter the notches a on the total and sub-total keys K63, K64. Said keys are thus locked when an overdraft condition is brought about during a subtracting operation by the wheel N50 of the highest order turning past the zero position to set up a negative amount.

The return arm N57 has a part f which is normally latched by a projection X on the adding hook N61. The projection f is arranged so that it will immediately contact with the lug or projection d of the arm 66N when the return arm N57 is released. This release is effected by the engagement of one of the points of the cam N56 with the adding hook N61 on the turning of the wheel N50 of the highest order in a counterclockwise direction, that is, in a direction opposite to the direction indicated by the arrow, Figure 1.

Consequently, if an overdraft has occured, as previously explained, and the actuating arm 71N has been released by the subtracting hook N62 as shown in Figure 2, the operator may release the total and sub-total keys K63, K64, which are then locked, by operating the numeral keys of the machine to such extent that the then existing negative amount will be converted into a positive amount on the accumulator.

When this is done the wheel N50, turning in a counterclockwise direction, trips the adding hook N61, bringing it to the dotted line position shown in Figure 3, whereupon the projection X clears the projection f. The spring 81N then snaps the return arm N57, causing the projection f to engage the projection d of the arm 66N, thus turning the arm from the dotted line position to the full line position, Figure 3. This brings about a reversal of position of the arm N68 which pushes on the link 69L causing the bar 66L to swing the latches 67L, 68L to release them from the notches a in the total and sub-total keys.

In order that the total and sub-total keys, K63, K64, may be manually unlocked after an overdraft, means such as shown in the Bernau Patent No. 1,508,267 may be used whereby the decimal slide of the Ellis machine can exercise a resetting action when it is manipulated by the operator.

The decimal slide is shown at P67, said slide having a cam A which is adapted to be shifted into engagement with the forward end of a horizontal slidable set link 73P. The set link is engaged at 16P with a rock arm E60 fast on a shaft I1 which is mounted in suitable bearings on the machine frame. The arm C fast on the shaft I1 is arranged to wipe against the arm N68 when the decimal slide P67 is moved in the direction of the arrow, Figure 5, thus unlocking the latches 67L, 68L from the total and sub-total keys K63, K64. In the Ellis machine the decimal slide P67 may control other functions, as will be clear from the disclosures of the Bernau Patent 1,508,267 and Ellis Patent 1,197,276. Consequently it may be desirable to make provision for the manual release of the latches 67L, 68L without resort being had to the decimal slide P67. Therefore I provide a push bar 58I connected at 12I to the arm or rocker C and adapted to be actuated either rearwardly or forwardly by a duplex button 59I pivotally mounted on the machine at 17I and connected to the push bar 58I at 16I. The detent 16B holds the bar 58I in its two positions. By manipulating the button 59I the arm C can be operated to release the latches 67L, 68L, without resort being had to the decimal slide P67. Similarly, the arm C can be operated by the decimal slide P67 without resort being had to the duplex button 59I.

It is unnecessary to employ both of the manually operated devices aforesaid and either one of them may be dispensed with.

The return of the shaft I1 to its normal position is accomplished by the turning of the shaft N6 when the next overdraft occurs, or by pushing the upper end of the duplex button 59I.

I have shown no racks for operating the accumulator nor the restoring means of the Ellis machine but their operation in connection with the mechanism hereinbefore described, which is shown in the drawings, will be readily understood from the Ellis and Bernau patents to which reference has been made.

What I claim is:—

1. In a calculating machine, the combination with an accumulator, of an operating key, means for locking and unlocking said operating key, independent accumulator-operated latching members, one of which is operated by the accumulator when a subtracting operation thereon effects a negative result or "overdraft" in the accumulator, the other latching member being operated by the accumulator when further addition in the accumulator cancels said "overdraft," and actuating and return means under the control of said latching members for operating the key-locking means aforesaid, whereby the operating key is automatically locked when an "overdraft" occurs and is unlocked when further addition cancels the "overdraft."

2. In a calculating machine, the combination with an accumulator, of an operating key, means for locking and unlocking said operating key, independent accumulator-operated latching members, one of which is operated by the accumulator when a subtracting operation thereon effects a negative result or "overdraft" in the accumulator, the other latching member being operated by the accumulator when further addition in the accumulator cancels said "overdraft," a pivoted actuating member, and a pivoted return member, respectively under the control of the independent accumulator-operated latching members, the actuating member being adapted for operating the key-locking means to lock the key when an "overdraft" condition in the accumulator causes the subtracting latching member to release the said pivoted actuating member, and the return member being adapted for restoring the key-locking means to normal position to unlock the key when the adding latching member releases the return member on the cancellation of the "overdraft" by further addition in the accumulator.

3. In a calculating machine, the combination with an accumulator, of an operating key, means for locking and unlocking said operating key, a pivoted "overdraft" subtracting latching hook adapted to cooperate with the accumulator, a pivoted adding latching hook also adapted to cooperate with the accumulator, said subtracting latching hook being operated by the accumulator when a subtracting operation thereon effects a negative result or "overdraft" in the accumulator, said adding latching hook being operated by the accumulator when further addition in the accumulator cancels said "overdraft" or negative result, a spring-operated pivoted actuating member which is normally latched by the subtracting latching hook, and a spring-operated pivoted return member which is normally latched by the adding latching hook, said actuating member and said return member being released when their respective controlling latching hooks are operated by the accumulator, said actuating member being adapted to operate the key-locking means to lock the operating key when an "overdraft" occurs in the accumulator, and said return member being adapted to restore the key-locking means to normal condition when the overdraft is cancelled.

4. In a calculating machine, the combination with an accumulator, of an operating key, means for locking and unlocking said operating key, a pivoted "overdraft" subtracting latching hook adapted to cooperate with the accumulator, a pivoted adding latching hook also adapted to cooperate with the accumulator, said subtracting latching hook being operated by the accumulator when a subtracting operation thereon effects a negative result or "overdraft" in the accumulator, said adding latching hook being operated by the accumulator when further addition in the accumulator cancels said "overdraft" or negative result, a spring-operated pivoted actuating member which is normally latched by the subtracting latching hook, a spring-operated pivoted return member which is normally latched by the adding latching hook, said actuating member and said return member being released when their respective controlling latching hooks are operated by the accumulator, and a rockably mounted arm adapted to operate the key-locking means either to lock the key or to unlock said key, said actuating member being adapted to shift the rocker to cause the latter to operate the key-locking means to lock the operating key when an "overdraft" occurs in the accumulator, and said return member being adapted to turn the rocker in an opposite direction to restore the key-locking means to normal condition when the overdraft is cancelled.

In testimony whereof I affix my signature.

NATHAN W. PERKINS.